United States Patent [19]
Rowlands

[11] Patent Number: 6,126,073
[45] Date of Patent: *Oct. 3, 2000

[54] POINT-OF-SALE MICR PRINTING AND READING

[75] Inventor: Robert Rowlands, Auburn, N.Y.

[73] Assignee: Axiohm Transaction Solutions, Inc., Ithaca, N.Y.

[*] Notice: This patent is subject to a terminal disclaimer.

[21] Appl. No.: 09/130,811

[22] Filed: Aug. 7, 1998

[51] Int. Cl.[7] ........................................... G06K 7/00
[52] U.S. Cl. ............................. 235/449; 235/449
[58] Field of Search ..................... 235/449, 439, 235/486, 493; 364/705.02; 271/902; 400/73

[56] References Cited

U.S. PATENT DOCUMENTS 5,934,193  10/1999  Menzenski ........................ 101/287
5,965,862  10/1999  Momose ........................... 235/449

Primary Examiner—Karl D Frech
Attorney, Agent, or Firm—Salzman & Levy

[57] ABSTRACT

A transaction printer includes the MICR encoding of indicia at a precise location called the amount field. In order to accomplish this, an optical sensor is provided in a check processing machine at a point-of-sale to detect the edge of the check and stage it at a known location from the thermal, MICR print head. A clutch mechanism is used to engage the print head with a platen and to engage a read head with the check, so that indicia can be sequentially imprinted and read within the check processing machine in a single, sequential operation that moves the check from a home position to a MICR print position, and subsequently to a MICR read position.

11 Claims, 5 Drawing Sheets

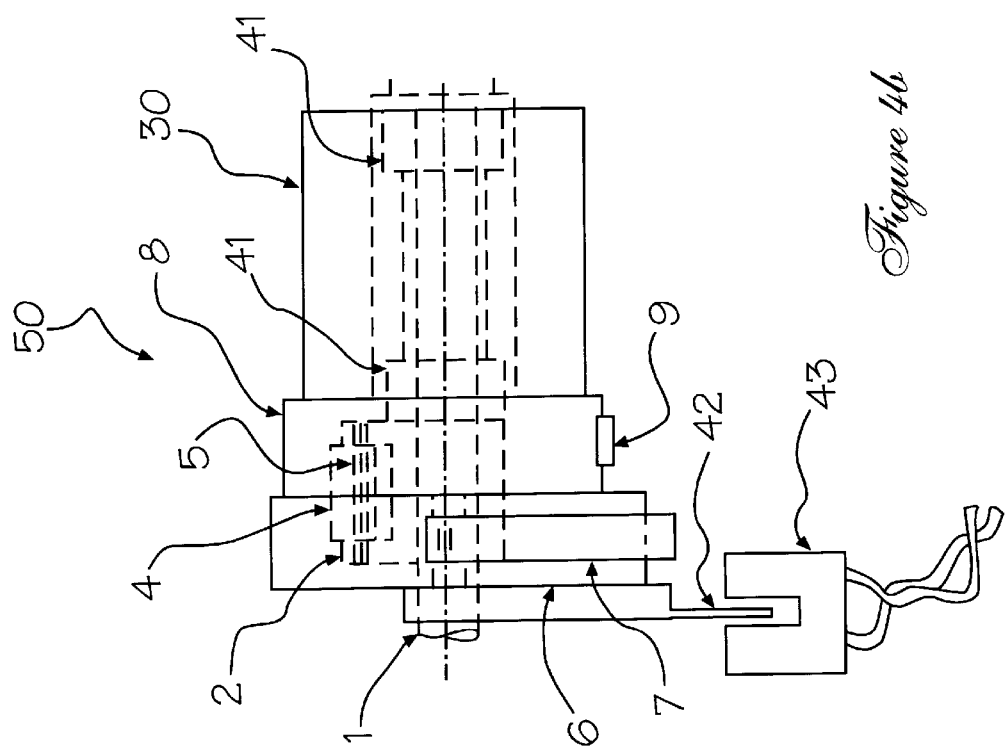
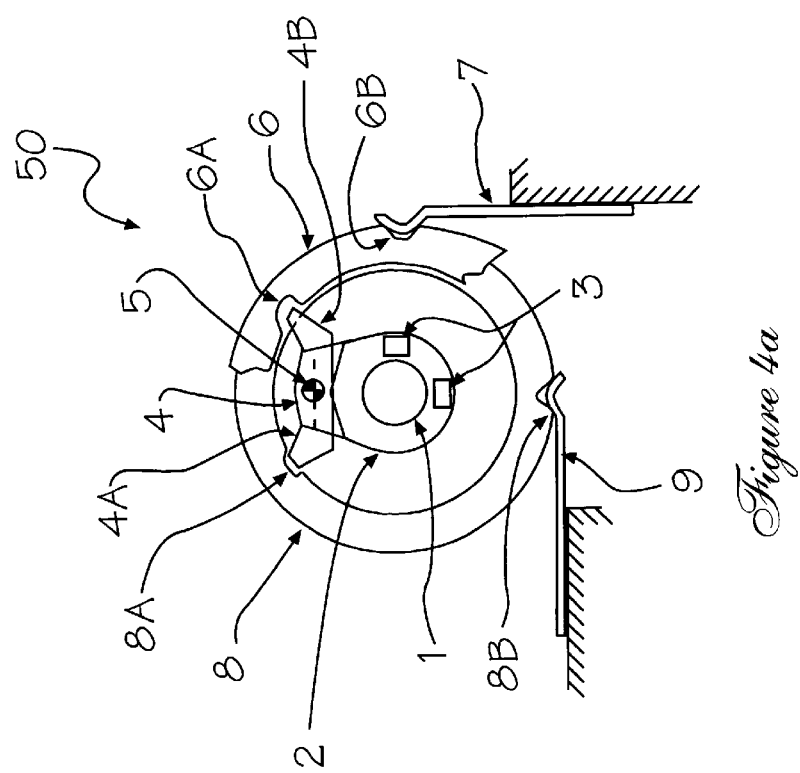
Figure 4b
Figure 4a

POINT-OF-SALE MICR PRINTING AND READING

FIELD OF THE INVENTION

The present invention relates to a point-of-sale (POS) transaction printer and, more particularly, to a point-of-sale transaction printer having a thermal printer for imprinting a check with MICR characters which are subsequently read and verified.

BACKGROUND OF THE INVENTION

In present day point-of-sale (POS) machines, the MICR indicia that are to appear on the check of a customer are added after the sale, and at a remote location (i.e., either at the bank, or in a separate, back room, at the retail site).

For the first time, this invention seeks to eliminate the post-operative role of supplying the required MICR indicia on a check presented for POS payment at a retail establishment. Owing to its new function, machines now being designed by the present assignee of this invention must be able to encode and read MICR characters located in a specific field (i.e., the amount field) of the check at the point-of-sale.

In a MICR encoder of the new machine, the MICR characters must be printed at a precise distance to the right edge of the check in order to place the MICR in the proper field site. In order to accomplish this, an optical sensor is provided to detect the edge of the check and stage it at a known location from the thermal, MICR print head. It then becomes an easy matter to advance the check by a stepper, drive and print motor a fixed number of step increments in order to start the printing sequence.

SUMMARY OF THE INVENTION

In accordance with the present invention, there is provided a transaction printer for encoding and subsequently reading MICR indicia upon a check presented for payment at a point-of-sale. The machine comprises a presenting zone, at which the check is presented to the machine with a specific facial orientation. The check is fed into the machine by a pair of drive rollers. The check passes an encoding MICR read head and presenting zone. A reflective optical sensor, disposed at the presenting zone, stages the check for various positions with respect to MICR printing and reading. As the check is fed backwardly towards the presenting zone, the lead edge of the check is sensed by the optical sensor. The sensor generates a signal in response to the sensing of the lead edge. This signal is sent to the drive rollers, commanding them to stop feeding the check. The check is now positioned for printing (encoding) the MICR characters in the amount field of the check. After the MICR indicia has been encoded by a thermal transfer printer, the drive rollers clamp and grip the check, and the check is driven past a read head of the check processing machine. The edge of the check is again sensed by the optical sensor, which sends a signal to stop the drive rollers. The MICR indicia are then read by the read head. After reading and verifying the MICR characters, the check is driven out of the check machine, and presented to the operator. The drive rollers are then opened to allow the operator to remove the check.

Novel to the thermal transfer printer of the check processing machine is a bi-directional clutch, which provides proper sequencing of indicia printing and reading. The bi-directional clutch comprises an internal pawl that engages a detent notch in a cam that raises and lowers a platen lift arm controlling the print platen, as the check is positioned for MICR imprinting and reading operations.

Another novel feature of this invention resides in the single stepper motor drive for the bi-directional clutch. All of the sequencing between printing of the MICR indicia and reading and verifying of the MICR characters can be accomplished in one sequential operation. This is due to the novel single stepper drive in combination with the bi-directional clutch, which allow the check to be processed in one continuous back-and-forth motion along the feed path of the check processing machine. The check is first introduced into the machine, and the bi-directional clutch is rotated clockwise from a home position to a MICR encode position. Then the clutch is rotated counterclockwise to a MICR read position. The clutch is then further rotated counterclockwise to the home position. Then the check is driven from the machine by the drive rollers, where it is withdrawn.

It is an object of this invention to provide a check processing machine for encoding and verifying MICR indicia on a check at a point-of-sale.

It is another object of the invention to provide an improved check processing machine wherein a check is imprinted with MICR indicia in the amount field of the check at the point-of-sale.

It is a further object of this invention to provide a check processing machine that can imprint MICR indicia and read the MICR indicia in one sequential operation.

It is yet another object of the invention to provide a check processing machine that can process a check in a single, sequential operation as a result of a novel bi-directional clutch driven that is driven by a single stepper drive motor.

BRIEF DESCRIPTION OF THE DRAWINGS

A complete understanding of the present invention may be obtained by reference to the accompanying drawings, when considered in conjunction with the subsequent detailed description, in which:

FIGS. 4a and 4b illustrate respective, front cut-away and side views of a bi-directional clutch for driving the platen and print head arm lift cam, shown in FIGS. 1 through 3.

For purposes of clarity and brevity, like elements and components will bear the same designation and numbering throughout the figures.

DESCRIPTION OF THE PREFERRED EMBODIMENT

Generally speaking, the invention features a transaction printer that encodes and reads MICR indicia at a point-of-sale. A sensor is provided in the MICR encoding portion of the printer to detect the edge of the check and allow precise registration of the edge for subsequent printing of the MICR characters. The sensor also provides check location information to the printer control electronics for various other operations required in the encode print sequence or other printer functions.

Figure 1:
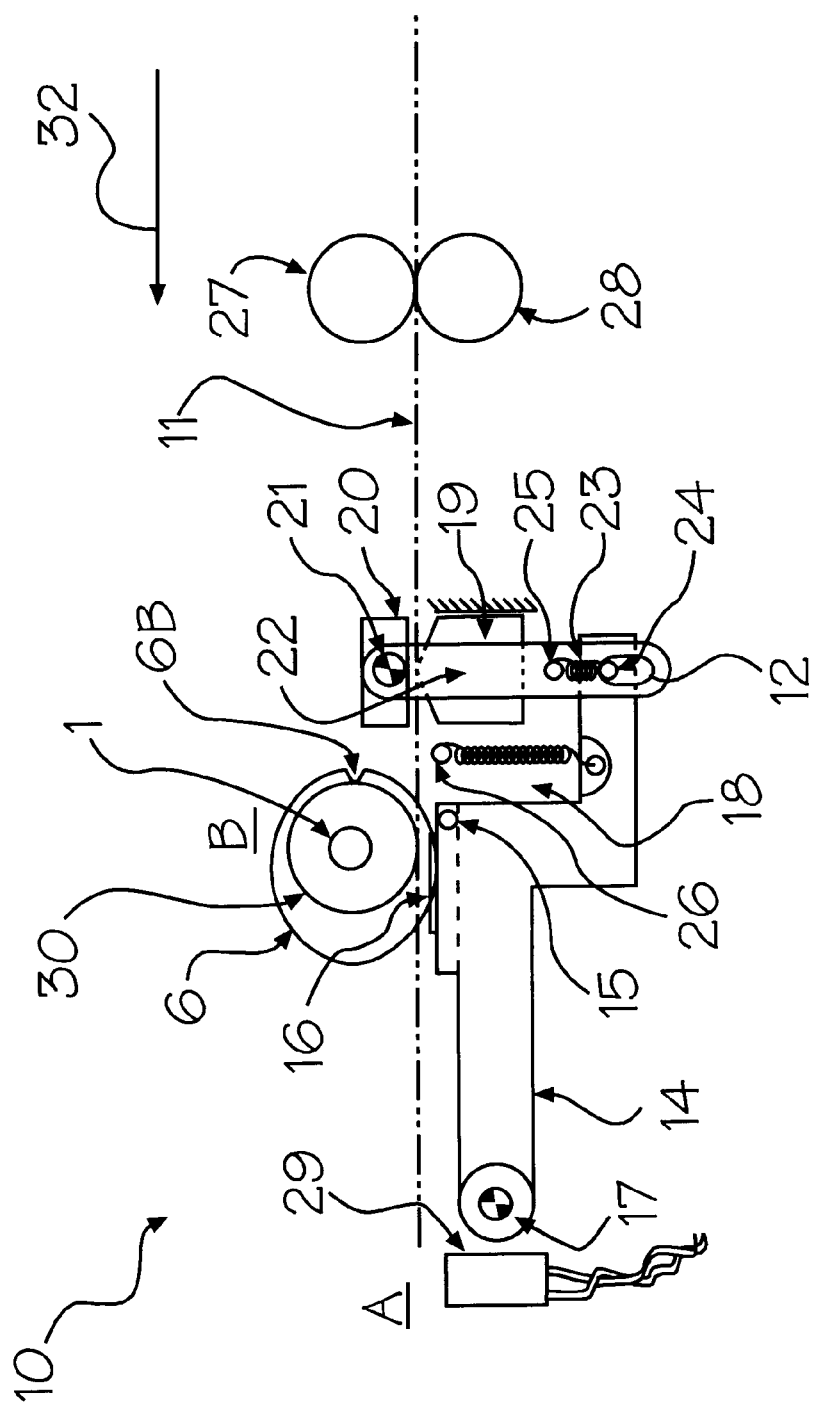
FIG. 1 illustrates a schematic view of a check processing apparatus in a first check handling position corresponding to the insertion of a check.

Referring to FIG. 1, a check processing apparatus 10 is shown. A check (not shown) is inserted into the check processing apparatus 10 at point A with a face down orientation. The check is fed into the apparatus 10, along the check feed path 11. The apparatus 10 is designed to encode the check with MICR indicia at the point-of-sale. To provide the MICR characters, a MICR encoder print head 16 and a MICR verifying read head 19 are disposed along feed path 11.

A pressure pad 20 is located above the MICR read head 19. This pressure pad presses the check, or other printed media, against the read head 19 to ensure good contact. A link 22 is connected to the pressure pad 20 through a pivot pin 21. A slot 12 at the distal end of the link 22 causes the link to be guided by link pin 24, which is fixedly attached to the end of the print head arm 14. The print head arm 14 is biased upwardly (arrow 33, FIG. 2) via spring 18 that is anchored to the housing pin 26. The pin 24, which rides in slot 12, is biased against the upper end of slot 12 by the tension spring 23 that is attached at its other end to pin 25. The spring 23 provides the contact force for pressure pad 20, as pin 24 moves away from pin 25 guided by the slot in link 22. The check, or other media, is driven by feed rollers 27 and 28, which are part of the point-of-sale printer (not shown), which is positioned to the rear of the check processing apparatus 10.

A reflective optical sensor 29 disposed at point A stages the check for the various positions of the MICR print mechanism. In the home position 1, shown in FIG. 1, the cam 6 holds the print head 16 away from the platen 30 by bearing against pin 15. Pressure pad 20 is also held away from the MICR read head 19 in the home position, as previously mentioned. Therefore, a check or other media can now be inserted into the print zone B of the check processing apparatus 10. Feed rollers 27 and 28, which are normally separated, are now clamped together to grip the inserted check, and feed it into the main printer unit for validation of account information on the check using a second MICR read head (not shown). The feed rollers 27 and 28 are rotated by a stepper motor (not shown). The check is driven back out (arrow 32) when the account validation operation is complete. The feed rollers 27 and 28 stop feeding the check when the lead edge of the check is detected by the reflective optical sensor 29 at point A. The check is now positioned for printing (encoding) of the MICR characters in the amount field of the check.

Figure 2:
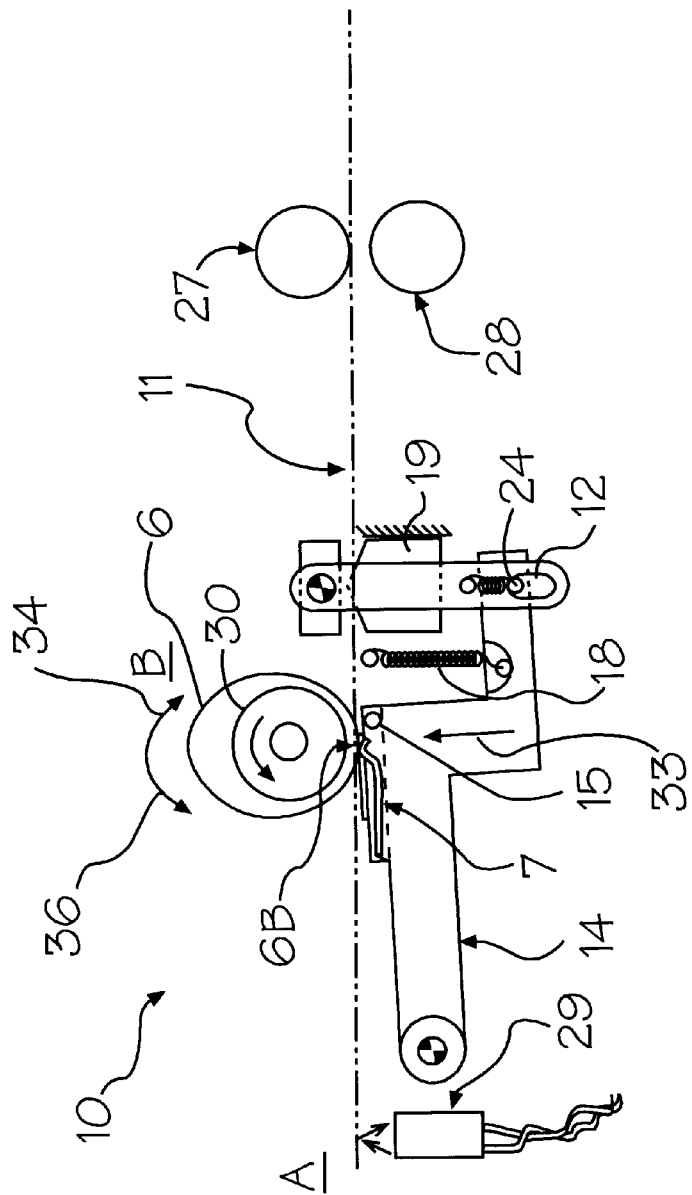
FIG. 2 depicts a schematic view of a check processing apparatus in a second check handling position corresponding to the MICR encoding of indicia thereupon.

Referring to FIG. 2, the second position of the check processing apparatus 10 is illustrated. In this position, also known as the MICR encode position, cam 6 rotates clockwise (arrow 34), so that there is now clearance between the cam 6 and pin 15. This allows the print head 16 to press a print ribbon (not shown) and the check against platen 30. A detent spring 7 engages in a suitable notch 6B in the cam, to hold the cam position. The cam 6 and platen 30 are both rotatively fixed upon the power input shaft 1. The cam 6 or platen 30 are selectively driven by the shaft 1, when the shaft 1 rotates either clockwise (arrow 34) to drive cam 6, or counter-clockwise (arrow 36, FIG. 2) to drive the platen 30. This is accomplished by a bi-directional clutch mechanism 50 disposed within the cam 6, as is explained hereinafter with reference to FIGS. 4a, 4b, and 5. Shaft 1 is driven in the counter-clockwise direction 36, in order to drive the platen 30 in the same direction. The edge of the check is detected by the reflective optical sensor 29 at point A. This commands the control electronics of the check processing apparatus 10 to start energizing the heater elements on the print head 16, which melts and transfers a wax-based ink from the ribbon to the check, thereby forming the MICR characters. It should be noted that feed rollers 27 and 28 are disengaged (opened) before platen 30 starts rotating. Pressure pad 20 and MICR read head 19 are also held apart.

Figure 3:
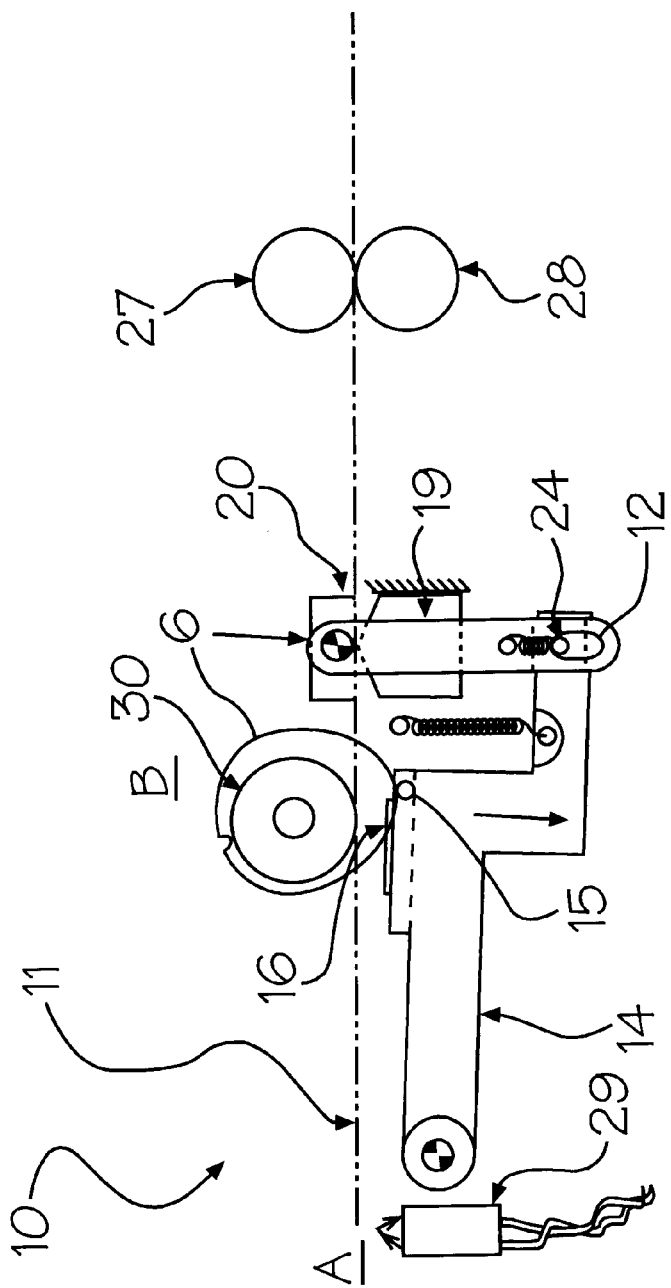
FIG. 3 shows a schematic view of a check processing apparatus in a third check handling position corresponding to reading of the imprinted MICR characters on the check.

Referring to FIG. 3, the third position of apparatus 10 is shown. In this position, the MICR indicia printed upon the check are read. Feed rollers 27 and 28 are clamped together and grip the check after the MICR indicia has been printed. Power input shaft 1 rotates clockwise and drives the cam 6 half-way to its high point. In this position, there is clearance between the print head 16 and platen 30, and also between pressure pad 20 and the MICR read head 19. The check is then driven back out of the apparatus 10, where it is detected by the reflective optical sensor 29, which stops the feed rollers 27 and 28. Shaft 1 continues rotating clockwise and drives cam 6 to its high point against pin 15, and stops. This allows pressure pad 20 to contact and press the check against the MICR read head 19. Feed rollers 27 and 28 then drive the check past the MICR read head 19, which verifies the printed MICR characters. Cam 6 is then rotated clockwise back to position 1, so that there is again clearance between print head 16 and platen 30, and pressure pad 20 and the MICR read head 19. Feed rollers 27 and 28 then drive the check back out of the check processing apparatus 10, and present it to the operator. Feed rollers 27 and 28 open to allow removal of the check. The mechanism is now back at the home position (FIG. 1), and is now ready for another point-of-sale transaction.

It can be observed that the optical sensor 29 plays a very important role in the processing of MICR imprinting and reading. The amount field must be precisely and accurately ascertained for both operations. Sensing the leading edge of the check precisely locates the amount field upon the check being processed. It then becomes a simple matter to advance the check by a stepper drive and print motor a fixed number of step increments in order to start the printing or read sequences.

Now referring to FIGS. 4a and 4b, respective frontal cut-away and side views are shown of the bi-directional clutch 50, which drives cam 6 and platen 30. A drive dog 2 is fixedly coupled to the input shaft 1 via set screws 3. A drive pawl 4 is pivotally attached to the drive dog 2 via pivot pin 5. The pawl tooth 4a ramps away from the angular detent surface of notch 8a disposed in clutch surface 8, when the shaft 1 is rotated in the clockwise direction (arrow 34, FIG. 2). The tooth 4a then engages in notch 6a disposed on cam 6. The cam 6 is normally held in position by leaf spring 7, which engages detent notch 6b. As the drive dog 2 continues to rotate in the clockwise direction (arrow 34), the detent force of leaf spring 7 is overcome, and the cam 6 rotates to the MICR encode position shown in FIG. 2.

The pawl tooth 4b ramps away from the angular detent surface 6a in cam 6, when the shaft 1 rotates in the counterclockwise direction (arrow 36, FIG. 2). The leaf spring 9 normally disposed in the detent 8b of the clutch surface 8, and which holds same in position, is overcome by the counter-rotative force, allowing the check processing apparatus 10 to achieve the MICR read position, shown in FIG. 3. The clutch 50 is driven by a stepper motor 40, whose shaft 1 supports platen 30 via bearings 41, shown in FIG. 4b. An arm 42 attached to shaft 1 passes through an optical sensor 43, as shown. The optical sensor 43 detects a home position of stepper motor 40, and hence the position of the cam 6.

Figure 5:
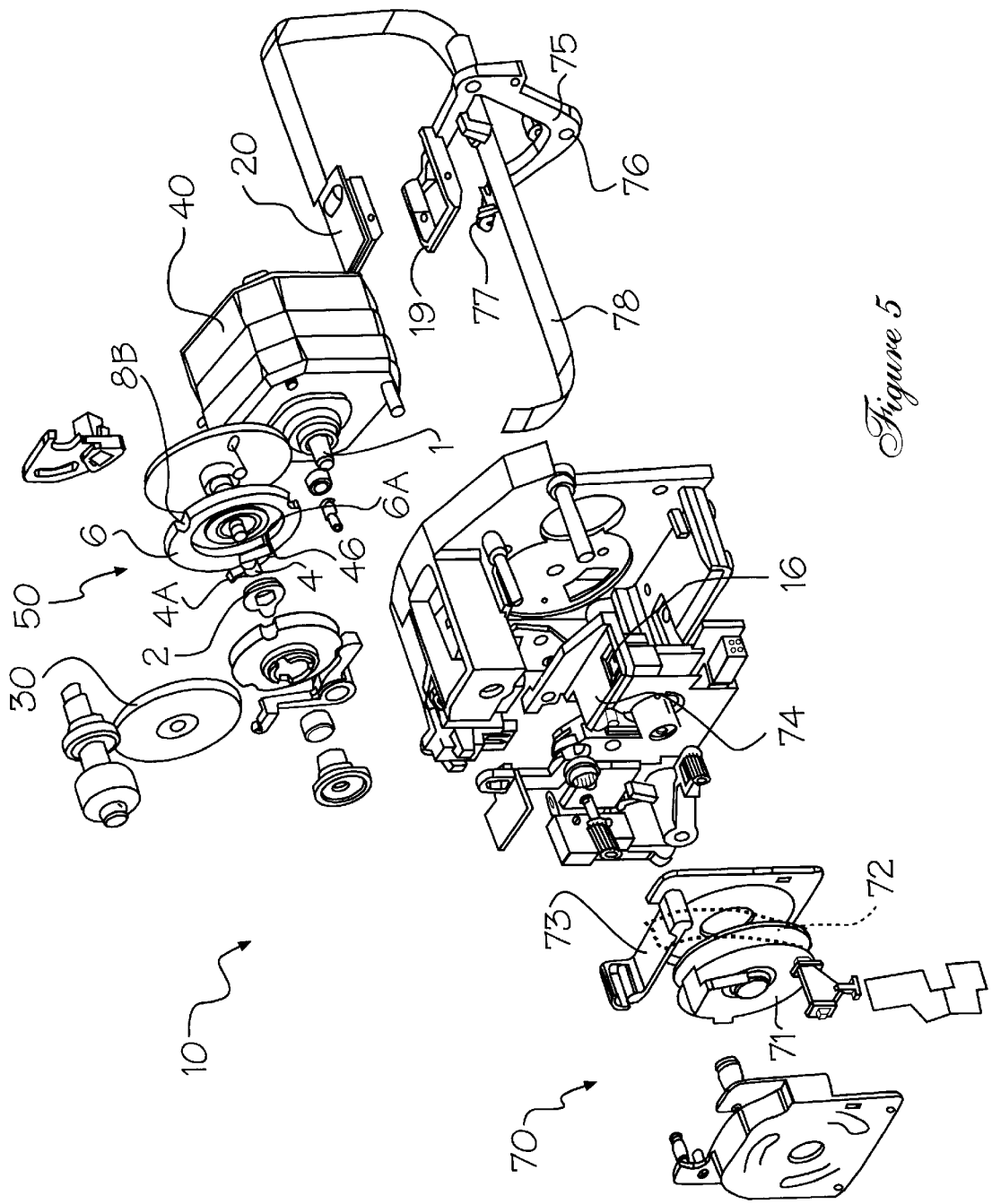
FIG. 5 depicts a perspective, exploded view of the check processing apparatus shown schematically in FIGS. 1 through 3, and including the bi-directional clutch illustrated in cutaway in FIGS. 4a and 4b.

Referring to FIG. 5, an exploded, perspective view of the actual check processing apparatus 10, is shown. A cassette 70 contains a roll 71 of thermal ribbon 72. The ribbon 72 is moved across the stage 73 of cassette 70, as the roll 71 is rotated by shaft 1. The ribbon 72 is threaded through the printing stage 74. The platen 30, which is influenced by the bi-directional clutch 50, acts to control the encoding of MICR indicia by forcing the ribbon 32 into contact with the printing head 16.

The read head 19 comes into contact with the pad 20 via a pivot arm 75 that pivots about pivot 76. The pivot arm 75 has a finger 77 that rests in detent 8b. Movement of the bi-directional clutch 50 to the MICR read position forces the arm 75 to pivot, causing the read head 19 to come into contact with pad 20. The pivot arm 75 is biased against contact with pad 20 by leaf spring 78.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A transaction printer for encoding and reading MICR indicia upon said check at a point-of-sale in a single, sequential operation, said transaction printer comprising:

means defining a check processing feed path;

check feeding means disposed along said check processing feed path for feeding said check along said check processing feed path from a home position at which said check is inserted into said check processing machine to a MICR encode position at which MICR indicia are imprinted upon said check, and then to a MICR read position at which said imprinted MICR indicia are read and verified, and thereafter back to said home position at which said check is withdrawn from said check processing machine;

a MICR encoding zone disposed along said feed path, said MICR encoding zone imprinting MICR characters upon said check when said check is in said MICR encode position; and a MICR read zone disposed along said feed path, said MICR read zone reading and verifying said MICR indicia that have been imprinted upon said check.

2. The transaction printer in accordance with claim 1, wherein said MICR encoding zone comprises a MICR printer and said MICR read zone comprises a read head, said check processing machine further comprising a stepper motor and a bi-directional clutch to move said check from said MICR encode position to said MICR read position.

3. The transaction printer in accordance with claim 2, further comprising sensing means disposed adjacent said stepper motor for determining a home position for said stepper motor.

4. The transaction printer in accordance with claim 2, further comprising sensing means disposed adjacent stepper motor determining a home position for said bi-directional clutch.

5. The transaction printer in accordance with claim 1, further comprising sensing means disposed along said feed path for determining a home position for said check, said sensing means providing a signal to said stepper motor to drive said bi-directional clutch to said MICR encode position.

6. A transaction printer for encoding and reading MICR indicia upon said check at a point-of-sale in a single operational sequence, said check processing machine comprising:

means defining a check processing feed path;

means disposed along said check processing feed path for feeding said check along said feed path; and check encoding and reading zones disposed along said feed path for sequentially imprinting, reading and verifying MICR indicia disposed upon said check.

7. The transaction printer in accordance with claim 6, further comprising sensing means for determining a home position for said check.

8. A method of processing a check at a point-of-sale, such that said check is encoded with MICR indicia, read, and verified in one sequential operation, the method comprising the steps of:

a) presenting a check at a point-of-sale to a check processing machine having MICR encoding and reading capability; and b) driving said check back and forth along a MICR encoding feed path to provide a sequential check processing operation, including the further sub-steps of:

i) positioning a check at a home position;

ii) imprinting said check with MICR indicia in an amount field of said check;

iii) reading and verifying said MICR indicia imprinted in sub-step (ii); and iv) returning the imprinted and read check to said home position.

9. The method in accordance with claim 8, further comprising a sensing step for sensing a leading edge of said check in order to determine a location of said amount field upon said check.

10. The method in accordance with claim 8, further comprising the step of:

c) sensing a home position of drive means.

11. The method in accordance with claim 9, further comprising:

c) sensing a home position of drive means.

\* \* \* \* \*